United States Patent
Fix et al.

(10) Patent No.: US 11,326,947 B2
(45) Date of Patent: May 10, 2022

(54) SPECTRAL FILTER COMPRISING AT LEAST TWO COUPLED FABRY-PEROT STRUCTURES

(71) Applicant: OFFICE NATIONAL D'ETUDES ET DE RECHERCHES AÉROSPATIALES, Palaiseau (FR)

(72) Inventors: Baptiste Fix, Paris (FR); Julien Jaeck, Bures-Sur-Yvette (FR); Patrick Bouchon, Verrieres Le Buisson (FR); Riad Haidar, Paris (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 0 days.

(21) Appl. No.: 17/255,820

(22) PCT Filed: Jun. 25, 2019

(86) PCT No.: PCT/EP2019/066833
§ 371 (c)(1),
(2) Date: Dec. 23, 2020

(87) PCT Pub. No.: WO2020/002330
PCT Pub. Date: Jan. 2, 2020

(65) Prior Publication Data
US 2021/0364354 A1   Nov. 25, 2021

(30) Foreign Application Priority Data

Jun. 28, 2018 (FR) .................................. 18 55831

(51) Int. Cl.
*G01J 3/26* (2006.01)
*G01J 3/28* (2006.01)

(52) U.S. Cl.
CPC .............. *G01J 3/26* (2013.01); *G01J 3/2823* (2013.01); *G01J 2003/2826* (2013.01)

(58) Field of Classification Search
CPC .... G01J 2003/2826; G01J 3/26; G01J 3/2823; G02B 26/001; G02B 5/288
See application file for complete search history.

(56) References Cited

U.S. PATENT DOCUMENTS

| | | | |
|---|---|---|---|
| 2008/0049228 A1* | 2/2008 | Chan ......................... | G01J 3/42 356/454 |
| 2021/0302230 A1* | 9/2021 | Silvestri ................. | G02B 5/288 |

OTHER PUBLICATIONS

International Search Report for PCT/EP2019/066833 dated Aug. 7, 2019, 4 pages.

(Continued)

*Primary Examiner* — Hina F Ayub
(74) *Attorney, Agent, or Firm* — Nixon & Vanderhye

(57) ABSTRACT

Disclosed is a spectral filter including a plurality of Fabry-Perot structures which are collectively carried by a support, and coupled together so as to produce a coupling resonance that is distinct from individual resonances of each of the Fabry-Perot structures. The coupling resonance may have a higher quality factor than the quality factors of the individual resonances. Each Fabry-Perot structure includes two portions of metal surfaces which are parallel to a face of the substrate, so that electromagnetic radiation wave components propagating within each Fabry-Perot structure, and which contribute to the coupling resonance, have a direction of propagation that is parallel to the face of the substrate.

20 Claims, 7 Drawing Sheets

(56) References Cited

OTHER PUBLICATIONS

Written Opinion of the ISA for PCT/EP2019/066833 dated Aug. 7, 2019, 7 pages.
Makhsiyan et al., "Plasmonic nano-antennas for spectral emissivity engineering", Proceedings of SPIE, May 5, 2015, vol. 9502, 6 pages.
Seifouri et al., "Symmetric metal nanogratings and horned shape extended pads to enhance light transmission of plasmonic metal-semiconductor-metal photodetector", Optical and Quantum Electronics, Mar. 10, 2017, vol. 49, No. 4, pp. 1-13.
Fix et al., "High-quality-factor double Fabry-Perot plasmonic nanoresonator", Optics Letters, Dec. 15, 2017, vol. 42, No. 24, pp. 5062-5065.
Lévesque, "Micro-optics design by sub-wavelength structuration," École Polytechnique, Oct. 17, 2014, 156 pages.

\* cited by examiner

SPECTRAL FILTER COMPRISING AT LEAST TWO COUPLED FABRY-PEROT STRUCTURES

This application is the U.S. national phase of International Application No. PCT/EP2019/066833 filed Jun. 25, 2019 which designated the U.S. and claims priority to FR Patent Application No. 18 55831 filed Jun. 28, 2018, the entire contents of each of which are hereby incorporated by reference.

BACKGROUND OF THE INVENTION

Field of the Invention

The present invention relates to a spectral filter which comprises at least two coupled Fabry-Perot structures.

Description of the Related Art

Fabry-Perot structures are well known and widely used for numerous applications, in particular for optical filtering applications. Each Fabry-Perot structure has two portions of reflecting surfaces which are positioned parallel to and facing one another, and at least one of them is partially transmissive. The structure then resonates when it receives incident electromagnetic radiation of variable wavelength. This resonance appears when a standing wave maintained by the incident radiation inside the Fabry-Perot structure, between its two portions of reflecting surfaces, has a maximum amplitude.

In Fabry-Perot structures of a first known type, each of the two portions of reflecting surfaces is a portion of an interface between a metal and a dielectric material. These portions are parallel and arranged facing one another on two opposite sides of the dielectric material, and one is thin enough to be partially transmissive. The standing wave which generates the resonant behavior consists of wave components which propagate perpendicularly to the portions of metal surfaces. The present invention does not relate to Fabry-Perot structures of this first type.

In Fabry-Perot structures of another type, also known, each of the two portions of reflecting surfaces is not composed of an interface between two different materials. Such a Fabry-Perot structure of this other type may again be formed by two interfaces, each between a metal and a dielectric material, which are parallel and arranged facing one another on two opposite sides of the dielectric material. In this case, the effective refractive index for the dielectric material is $n_{eff}$, given by $n_{eff}^2 = \varepsilon_d \cdot (1 + 2 \cdot \delta/h - \varepsilon_d/\varepsilon_m)$ where $\varepsilon_d$ and $\varepsilon_m$ are the respective dielectric permittivities of the dielectric material and of the metal, the metal being assumed to be the same for the two interfaces, $\delta$ is the thickness of the skin of this metal, and h is the thickness of the dielectric material between the two interfaces. The values of the effective refractive index which are thus obtained can be very high due to plasmons which appear in the metal. The refractive index which is thus effective inside the dielectric material therefore exhibits discontinuities at the ends of the metal-dielectric interfaces, going from the value $n_{eff}$ between the two interfaces to the value $\varepsilon_d^{1/2}$ beyond the ends of the interfaces. The two discontinuities in the refractive index which are thus created in the dielectric material determine two portions of surfaces which are partially reflecting, although they are not true interfaces between different materials. These two portions of partially reflecting surfaces then make it possible to contain a standing wave in the dielectric material, between the two metal-dielectric interfaces, the standing wave then propagating in parallel to these metal-dielectric interfaces. This standing wave can produce resonant behavior, which can be used for a variety of applications including spectral filtering applications. The article by M. Makhsiyan et al. which is entitled "Plasmonic nano-antennas for spectral emissivity engineering", Proc of SPIE, Vol. 9502, pp. 95020H-1 to 95020H-6, 2015, shows such Fabry-Perot structures which are neighbors on a common substrate, but which exhibit independent although spectrally close resonances.

According to yet another known type of Fabry-Perot structures, each structure consists of a trench which is formed from a flat face of a metal support, for example of gold. The depth-wise direction of the trench is perpendicular to the face of the support, and the trench has a profile of rectangular cross-section in a plane perpendicular to the face of the support, with a trench bottom that is flat and parallel to the face of the support. The extension of the face of the support across the opening of the trench, and the bottom of the trench, form the two portions of reflecting surfaces of such a Fabry-Perot structure. The standing wave which is maintained by the incident radiation inside the Fabry-Perot structure consists of wave components which propagate in the trench perpendicularly to the face of the support, from the face of the support towards the bottom of the trench and in the opposite direction. The resonance wavelength is determined by the depth of the trench, and the quality factor of this resonance depends in particular on the width of the trench. Actually, this third type of Fabry-Perot structure is a combination of the two presented above, since the bottom of the trench is a metal-gas interface which forms one of the portions of reflecting surfaces which is effective for the standing wave, and the other portion of reflecting surface which is simultaneously effective for this same standing wave connects the ends of the opposing walls of the trench at the flat face of the metal support. This latter portion of the reflecting surface is therefore not formed by an interface between two different materials.

The article entitled "High-quality-factor double Fabry-Perot plasmonic nanoresonator", by B. Fix et al., Optics Letters, Vol. 42, No. 24, pp. 5062-5065, and published on Dec. 15, 2017, describes arranging two Fabry-Perot structures in the form of respective trenches close to one another in the face of a common support. It discloses that a new resonance appears, which can be referred to as coupling resonance and which is distinct from the individual resonances of each of the two Fabry-Perot structures. In particular, the resonance wavelength of the coupling resonance, referred to below as the coupling resonance wavelength, is different from the resonance wavelengths of the individual resonances, referred to as the individual resonance wavelengths. To achieve this, the two Fabry-Perot structures must be different so that their individual resonance wavelengths are different. The quality factor associated with the coupling resonance can then be higher, or even much higher, than the quality factors of the individual resonances of the Fabry-Perot structures. This gain in terms of quality factor can be advantageous in many applications, particularly optical filtering applications.

In other words, a plurality of Fabry-Perot structures belonging to a same group are collectively carried by the face of the support. Each Fabry-Perot structure comprises two portions of reflecting surfaces which are arranged facing one another, parallel to one another, and separated from one another inside this structure by a dielectric medium. Each of the Fabry-Perot structures of the group is sized so that a wave component of electromagnetic radiation can propagate between the two portions of reflecting surfaces of this structure, from one to the other, and so that a standing wave results from multiple reflections of the wave component which occur in alternation at the two portions of reflecting surfaces. An individual resonance of each Fabry-Perot structure then corresponds to a maximum of amplitude of the standing wave inside this structure when a wavelength of an electromagnetic radiation incident on the support varies.

In addition, at least one of the portions of reflecting surfaces of each Fabry-Perot structure of the group is separated from at least one of the portions of reflecting surfaces of each other structure of the same group by an intermediate space parallel to the face of the support.

Furthermore, at least one parameter which determines the individual resonance of each Fabry-Perot structure of the group, separately from each other Fabry-Perot structure, has values which differ between at least two of the structures of the same group. These at least two structures thus have respective values of individual resonance wavelength, effective for the electromagnetic radiation incident on the support, which are different. Simultaneously, these at least two Fabry-Perot structures have respective values of an individual resonance quality factor such that, on a wavelength axis of the incident radiation, the following ranges of individual resonances: $[\lambda_{ri} \cdot (1-3/Q_i); \lambda_{ri} \cdot (1+3/Q_i)]$ have a pairwise overlap, where i is an integer that identifies each Fabry-Perot structure within the group, and $\lambda_{ri}$ and $Q_i$ are respectively the values of the resonance wavelength and of the quality factor of the individual resonance of Fabry-Perot structure i.

Also furthermore, a thickness $h_i$ of the dielectric medium, which is relative to Fabry-Perot structure i and measured perpendicularly to the direction of propagation of the wave components forming the standing wave inside this Fabry-Perot structure i, is greater than or equal to $0.125 \cdot \lambda_{ri}/n_{eff\_i}$, $n_{eff\_i}$ being the refractive index which is effective for the dielectric medium of Fabry-Perot structure i. In other words, $h_i \geq 0.125 \cdot \lambda_{ri}/n_{eff\_i}$. This condition means that each Fabry-Perot structure i is under-coupled to the propagation medium which is external to the spectral filter, so that it has a reflectivity or energy transmissivity value, depending on whether the spectral filter is intended to be used in reflection or transmission, which is significantly different from zero. For example, the limit $VL_i=0.125 \cdot \lambda_{ri}/n_{eff\_i}$ may correspond to a reflectivity or energy transmissivity value, depending on whether the spectral filter is intended for use in reflection or transmission, of approximately 0.39 for Fabry-Perot structure i at the individual resonance wavelength $\lambda_{ri}$ of this structure.

When these conditions are satisfied, a coupling between two of the Fabry-Perot structures of the same group, whose individual resonance wavelength values are different, is produced by the intermediate space which exists between these two structures. Possibly, a material that is present in this intermediate space can also contribute to the coupling. An additional condition for the coupling to be effective is that a separation distance between the two Fabry-Perot structures thus coupled, which is determined by their intermediate space parallel to the face of the support, is less than a resonance wavelength value relating to the coupling, called the coupling resonance wavelength, and effective for the electromagnetic radiation which is incident on the filter. This coupling resonance results from interference between at least three waves which include:

- a first wave which originates from a reflection of the incident radiation on the face of the support, or from a transmission of the incident radiation through the support;
- a second wave which comes out from a first of the Fabry-Perot structures of the group, and which results from a superposition of several wave components among which at least one has completed at least one round trip inside a second of the Fabry-Perot structures of the same group, coupled with the first structure; and
- a third wave which comes out from the second of the Fabry-Perot structures of the group, and which results from another superposition of several other wave components among which at least one has completed at least one round trip inside the first of the Fabry-Perot structures of the group.

The support thus provided with Fabry-Perot structures, some of them coupled together in the manner just described, possesses a reflection spectrum which has a minimum. This minimum may be narrow, so that the support can constitute a spectral filter of improved selectivity in comparison to the respective individual resonances of the Fabry-Perot structures. This improvement in the filtering selectivity results from the coupling which exists between some of the Fabry-Perot structures.

The condition $h_i \geq 0.125 \cdot \lambda_{ri}/n_{eff\_i}$ for i equal to 1 and 2, introduced above, ensures that the second and third waves which participate in the interference of at least three waves, have respective amplitudes that are sufficient for the coupling resonance to exist.

In the case of the article by B. Fix et al. cited above, the group contains two coupled Fabry-Perot structures, each in the shape of a trench, and the parameter that determines the individual resonance wavelength of each Fabry-Perot structure, separately from the other Fabry-Perot structure, is the depth of the trench. The value of the coupling resonance wavelength is also determined by the depths of the trenches, but in addition by the separation distance that exists between these trenches. However, it is particularly difficult to have sufficient control over the creation of such trenches, which are close to one another, to obtain a precise desired value for the coupling resonance wavelength. In addition, the partitions between neighboring trenches can become fragile when the trenches are very close. The filter which is then obtained can be particularly sensitive to accidental scratches.

Based on this situation, one object of the invention consists in providing a new filter which comprises at least one group of Fabry-Perot structures in which at least some are coupled, and which can be manufactured simply and at low cost.

An additional object may be that such a filter exhibits greater resistance, in particular against scratches.

SUMMARY OF THE INVENTION

To achieve at least one of these or other objects, a first aspect of the invention proposes a filter with a plurality of coupled Fabry-Perot structures as described above, but in which each Fabry-Perot structure comprises two portions of metal surfaces which are parallel to the face of the support. Each Fabry-Perot structure further comprises an internal volume which is limited between these two portions of metal surfaces, perpendicularly to the face of the support, and limited parallel to the face of the support between opposite edges of at least one of the two portions of metal surfaces of the structure. These two opposite edges determine the positions of the portions of reflecting surfaces of the Fabry-Perot structure, so that the wave components which contribute to the coupling resonance propagate parallel to the face of the support inside each of the coupled Fabry-Perot structures.

A filter according to the invention can therefore be devoid of trenches extending deep into the support of the filter, so that its manufacture does not require deep etching of this support. In particular, a filter according to the invention can be manufactured by implementing only steps of depositing materials, possibly through appropriate masks, and optionally steps of etching the materials which have been deposited. This filter can thus have a reduced cost price compared to a known filter of the prior art based on Fabry-Perot structures in the form of trenches.

In particular, a filter according to the invention does not have partition walls between neighboring trenches, so it has greater resistance against unintentional scratches.

In various embodiments of the invention, the parameter which determines the individual resonance of each Fabry-Perot structure of the group, separately from each other Fabry-Perot structure of that group, and which has values which differ between two structures of the group which are coupled with each other, may be one of the following:
- a width of the internal volume of each structure, measured parallel to the face of the support between the portions of reflecting surfaces of this structure,
- a refractive index of the dielectric medium in the internal volume of each structure,
- a fill ratio and/or a composition of the dielectric medium in the internal volume of each structure,
- a coefficient of electromagnetic radiation absorption by each structure,
- or a combination of several of the above parameters.

Such implementations of differentiation between Fabry-Perot structures which are coupled can easily be implemented, without significantly increasing the manufacturing complexity or the cost price of the filter.

Within the filter, the group of Fabry-Perot structures may comprise only two Fabry-Perot structures which are coupled with each other. Alternatively, it may comprise three Fabry-Perot structures which are coupled together in pairs, thus producing two or three coupling resonances, in particular according to their respective individual resonance wavelength values. In general, the group may comprise any number of Fabry-Perot structures that is greater than or equal to two structures, producing as many coupling resonances as there are different pairs of Fabry-Perot structures which are coupled together within the group.

Advantageously, each Fabry-Perot structure of the group, in particular a thickness of the internal volume between the two portions of metal surfaces of this structure, measured perpendicularly to the face of the support, may be designed so that the value of the individual resonance quality factor of that structure is less than 20. Simultaneously, the group of Fabry-Perot structures, in particular the intermediate space between two of the structures of this group which are coupled, may be designed so that a quality factor associated with the coupling resonance is greater than 20, preferably greater than 70, or even greater than 150. In this manner, the filter can have a high selectivity, or a very high selectivity, produced by at least one of the coupling resonances.

In some advantageous embodiments, in particular embodiments which are easy to implement, the dielectric medium in the internal volume of each Fabry-Perot structure may consist of a respective portion of a layer having parallel faces and uniform thickness, this layer being identical for all structures of the group and consisting of a solid dielectric material.

Possibly, a pattern comprising the Fabry-Perot structures of the group, as separated by each intermediate space between two such structures within the group, may be repeated multiple times on the face of the support.

Then, for embodiments of the invention with a one-dimensional pattern, at least one of the portions of metal surfaces of each of the Fabry-Perot structures may be one face of a respective metal strip. In this case, the pattern which comprises the Fabry-Perot structures of the group may be repeated multiple times, preferably periodically, in a repeat direction which is parallel to the face of the support, in the form of separate and parallel metal strips.

Alternatively, for embodiments of the invention with a two-dimensional pattern, at least one of the portions of metal surfaces of each Fabry-Perot structure may have a square, rectangular, circular, elliptical, cross, or L shape, parallel to the face of the support. In such an alternative case, the pattern which comprises the group of Fabry-Perot structures may be repeated multiple times in two repeat directions which are distinct and parallel to the face of the support, preferably periodically, and preferably both repeat directions are perpendicular to each other. Possibly, for such embodiments of the invention with a two-dimensional pattern, the pattern may comprise four Fabry-Perot structures which are arranged in a 2×2 matrix along both repeat directions, thus forming six pairs of Fabry-Perot structures. Each pair is associated with an intermediate space between two of the structures of the pattern other than the intermediate space of every other pair of structures in the pattern, and at least some of the intermediate spaces produce a coupling between the structures of the corresponding pair.

In general, a spectral filter according to the invention can be adapted for use in reflection. In this case, the first, second, and third waves are produced by the filter on one side of the support where the incident radiation reaches the filter. Alternatively, other spectral filters according to the invention can be adapted for use in transmission.

The improvement that is proposed now may be adapted in order to obtain a filter with a steep cut-off and/or with a spectral selection window which is widened. To this end, the filter may further comprise at least one Fabry-Perot resonator which has an additional individual resonance, effective for the incident radiation in addition to each coupling resonance. The accordingly added Fabry-Perot resonator may be designed so that its individual resonance wavelength value is shifted relative to at least one coupling resonance wavelength value of the group of Fabry-Perot structures, and so that this coupling resonance wavelength value is within the following range for the individual resonance of the Fabry-Perot resonator: $[\lambda_{r0} \cdot (1-10/Q_0); \lambda_{r0} \cdot (1+10/Q_0)]$, where $\lambda_{r0}$ and $Q_0$ are respectively the values of the resonance wavelength and of the quality factor for the individual resonance of the Fabry-Perot resonator. Thus, a spectral response profile of the filter, as a function of the wavelength of the incident radiation, results from a superposition of at least the individual resonance of each Fabry-Perot resonator with each coupling resonance of each group of Fabry-Perot structures. This profile can then have a steeper transition between a cutoff spectral domain and a windowed spectral domain, compared to a reference filter which would include the same Fabry-Perot resonator(s) but which would be devoid of the coupled Fabry-Perot structures. Optionally, the superposition may also include contributions from the individual resonances of the Fabry-Perot structures of each group.

Advantageously, for such filters with superposition of resonances, each Fabry-Perot resonator, in particular a thickness of an internal volume of the resonator, measured perpendicularly to a direction of a standing wave occurring in this internal volume, may be designed so that the value of the quality factor of the individual resonance of this resonator is less than 30. Simultaneously, the value of the quality factor associated with the coupling resonance wavelength located within the range $[\lambda_{r0} \cdot (1-10/Q_0); \lambda_{r0} \cdot (1+10/Q_0)]$ may be greater than 30. In this manner, the coupling resonance locally modifies the spectral profile produced by the individual resonance of the Fabry-Perot resonator. It is thus possible to create, accurately and on demand, a filter whose spectral response profile corresponds to an imposed specification.

Possibly, the Fabry-Perot resonator may be stacked on one of the Fabry-Perot structures of the group, in a stacking direction which is perpendicular to the face of the support. Such embodiments of the invention again are easy to manufacture, and allow reducing a residual reflection of the filter in its spectral selection window. Advantageously, a portion of metal layer may be common to the Fabry-Perot resonator and to the Fabry-Perot structure on which it is stacked. This common portion of metal layer then constitutes one of the portions of metal surfaces of the Fabry-Perot structure concerned.

Finally, a second aspect of the invention relates to a method for the spectral filtering of an electromagnetic radiation, which is implemented using at least one spectral filter according to the first aspect of the invention. To this end, the radiation to be filtered must have wavelength values which are larger than the intermediate space, measured parallel to the face of the support, which exists between two Fabry-Perot structures of the filter which are coupled with each other.

Such a method can be implemented for an application selected from: monochromatic or multispectral image capture, spectroscopic analysis, and selective emission of radiation produced by heating of the filter.

BRIEF DESCRIPTION OF THE DRAWINGS

Other features and advantages of the invention will become apparent from the following description of some non-limiting embodiments, with reference to the accompanying drawings in which:

FIG. 2b is a reflectivity diagram obtained for the embodiment of the invention of FIG. 2a;

FIG. 4 is a three-dimensional diagram showing the evolution of a reflectivity spectrum as a function of the thickness of dielectric material, for embodiments of the invention in accordance with FIG. 2a;

FIG. 7b is a cross-sectional view of the filter of FIG. 7a.

DETAILED DESCRIPTION OF SEVERAL EMBODIMENTS

For clarity, the dimensions of the elements represented in these figures do not correspond to actual dimensions nor to actual dimensional ratios. In addition, identical references indicated in different figures designate elements which are identical or have identical functions.

Figure 1A:
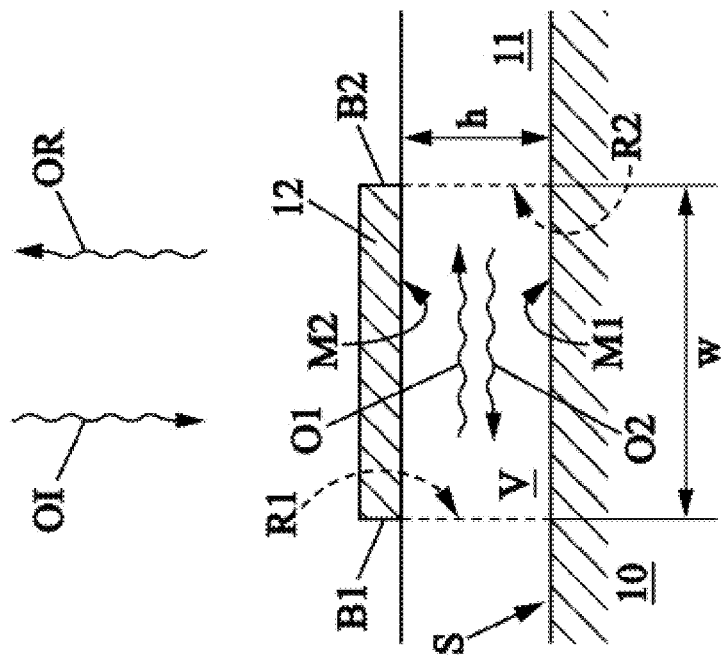
FIGS. 1a and 1b are cross-sectional views of two types of Fabry-Perot structures as known prior to the invention.

First we will recall the roles of several elements and parameters of a Fabry-Perot structure with reference to FIG. 1a. As shown in this figure, a Fabry-Perot structure of known type consists of a trench T with a profile of rectangular cross-section, which is formed in a substrate 10 forming a support. The trench T extends from a flat face S of the substrate 10. The substrate 10 is made of a metal material, for example gold. The trench T is laterally delimited by two opposing portions of metal surfaces, M1 and M2, which connect a bottom of the trench, denoted R1, to a surface portion R2 superposed on the opening of the trench T in the face S. The internal volume of the trench T is thus delimited by the portions of metal surfaces M1 and M2 in a direction parallel to the face S, and simultaneously by the surface portions R1 and R2 in the direction perpendicular to the face S. It is filled by a dielectric medium, for example air or a solid material such as silica ($SiO_2$). In a known manner, when a wave of electromagnetic radiation OI is incident on the face S, a wave OR is produced in reflection, its intensity dependent on the amplitude of a standing wave which appears in the trench T. This standing wave is the superposition of two wave components O1 and O2 which propagate in opposite directions inside the trench T, and which are alternately reflected by surface portions R1 and R2. In addition, the standing wave is coupled to the incident wave OI and to the reflected wave OR through surface portion R2. For this type of Fabry-Perot structures, surface portion R1 only serves as a mirror, and surface portion R2 serves two functions as a partially reflecting mirror and as partial transmission between the internal volume of the trench T and the outside. In a known manner, the resonance wavelength of such a Fabry-Perot structure is primarily determined by the length of the path of the standing wave in the internal volume of the trench T, according to the formula $\lambda_r \approx 2 \cdot n_{eff} \cdot h$, where $n_{eff}$ is the effective refractive index of the dielectric medium in the trench T, and h is the depth of the trench. The quality factor of this Fabry-Perot structure depends on the percentage that surface portion R2 occupies in the face S. In other words, it depends on the width w of the trench T.

Figure 1B:
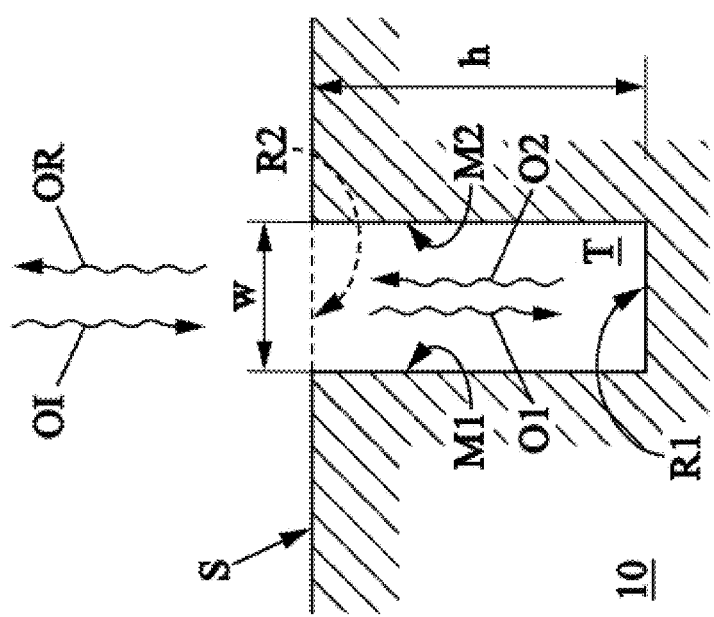

FIG. 1b shows another known type of Fabry-Perot structure, which can be created on the flat face S of the substrate 10, again acting as a support. The structure now comprises a stack, on the face S, of a layer of a dielectric medium 11 and of a metal portion 12. For example, the layer 11 may be made of silicon carbide (SiC) or of silica ($SiO_2$). It has parallel faces so that the metal portion 12 has a face M2 which is turned towards the substrate 10. The Fabry-Perot structure is then formed by the metal portion 12, the portion of layer 11 which is covered by portion 12, and by the portion of the face S which is directly in line with portion 12. This portion of the face S is denoted M1, because it has the same role in the Fabry-Perot structure of FIG. 1b as the portion of metal surface M1 in the Fabry-Perot structure of FIG. 1a. The face of the metal portion 12 which is oriented towards the substrate 10 is denoted M2, also because analogous to FIG. 1*a*. The two portions of surfaces defined from the opposite edges B1 and B2 of the metal portion 12, and which are perpendicular to the face S, act as semi-reflecting mirrors for wave components which propagate parallel to the face S between the portions of metal surfaces M1 and M2, to form a standing wave. Again because analogous to FIG. 1*a*, these wave components are denoted O1 and O2, but they propagate parallel to the face S of the substrate 10 in the case of FIG. 1*b*, unlike FIG. 1*a*. Again because analogous, the two portions of surfaces which reflect the wave components O1 and O2, and which are defined from edges B1 and B2, are also denoted R1 and R2 and are called portions of reflecting surfaces. The wave components O1 and O2 which form the standing wave propagate in the portion of the layer 11 which is covered by metal portion 12. This portion of the layer 11 constitutes the internal volume of the Fabry-Perot structure of FIG. 1*b*, denoted V. The resonance wavelength of such a Fabry-Perot structure is again mainly determined by the path length of the standing wave in the internal volume of the structure, now corresponding to the formula $\lambda_r \approx 2 \cdot n_{eff} \cdot w$, where $n_{eff}$ is still the effective refractive index for the dielectric medium in the internal volume V, but w now denotes the width of this internal volume parallel to the face S, in the direction of propagation of the wave components O1 and O2 which form the standing wave. The surface portions R1 and R2 now couple the standing wave to the incident wave OI and to the reflected wave OR. It is not necessary for layer 11 to extend beyond the portions of reflecting surfaces R1 and R2, on each side of the internal volume V of the Fabry-Perot structure. It can be replaced, outside this internal volume V, by air or any other dielectric material. The quality factor of the resonance of such a Fabry-Perot structure, in accordance with FIG. 1*b*, depends on the thickness h of the layer 11, meaning the thickness of the internal volume V measured perpendicularly to the face S, and of the medium/media present near the reflecting surfaces R1 and R2 outside the internal volume V. In addition, if the thickness h is greater than the limit value $VL = 0.125 \cdot \lambda_r / n_{eff}$, then the Fabry-Perot structure has an energy reflectivity value which is greater than 0.39 when it receives the incident wave OI and the latter has the value $\lambda_r$ for its wavelength. In this case, the Fabry-Perot structure is said to be under-coupled to the propagation medium of the OI and OR waves. If the resonance wavelength $\lambda_r$ is equal to 5.25 μm (micrometer) and the effective refractive index value $n_{eff}$ is equal to approximately 3.155, then the limit value $VL = 0.125 \cdot \lambda_r / n_{eff}$ is substantially equal to 0.208 μm.

The invention relates to the formation of a spectral filter based on a plurality of Fabry-Perot structures which are each in accordance with FIG. 1*b*.

Figure 2A:
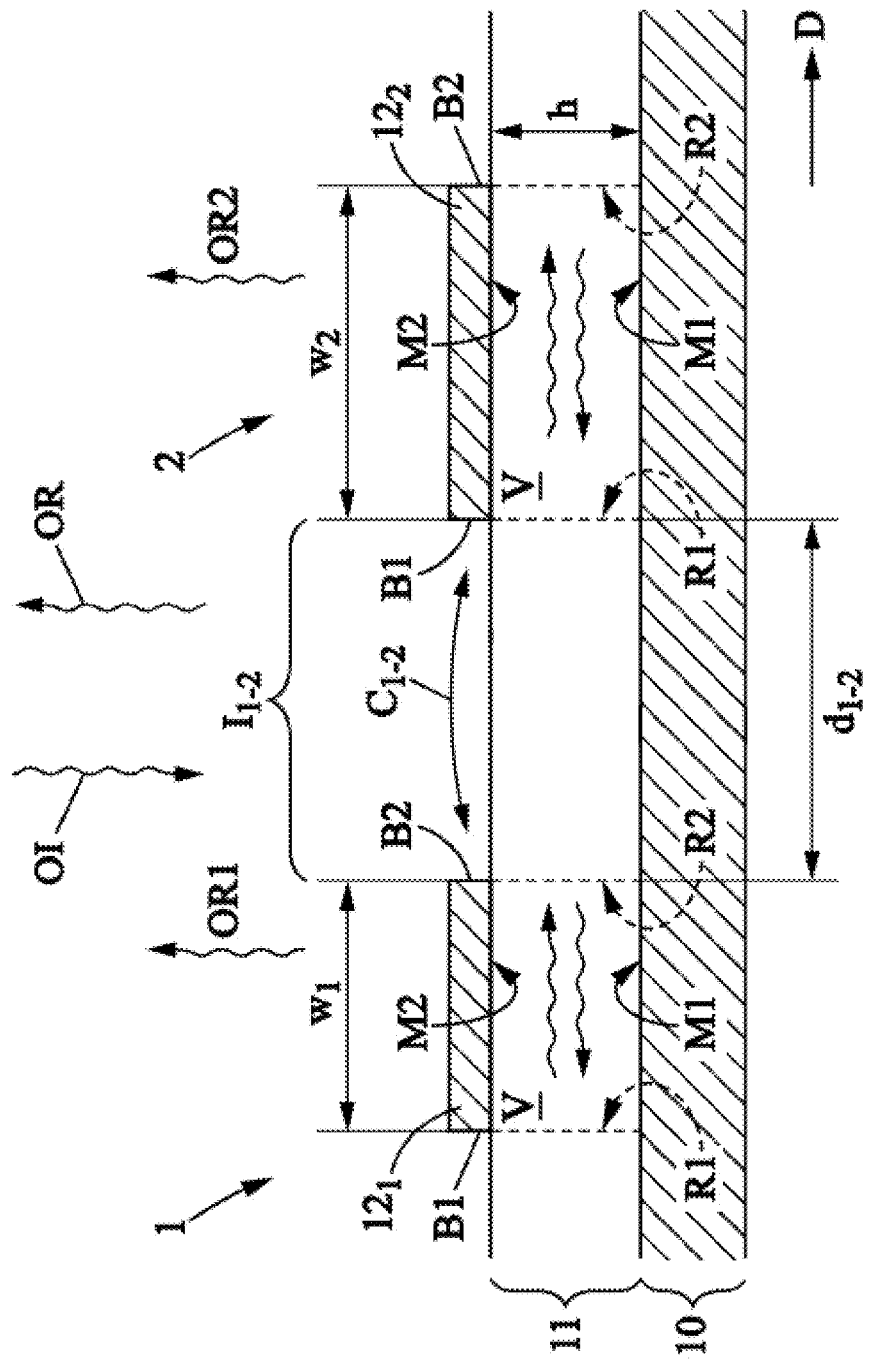
FIG. 2a is a cross-sectional view of a first embodiment of the invention, with two Fabry-Perot structures per group.

First embodiments of the invention may comprise a group of two Fabry-Perot structures, designated 1 and 2 in FIG. 2*a*, and which are carried by the same metal support 10 which may be of gold, silver, aluminum, etc. The two structures 1 and 2 are side by side along a direction D which is parallel to the face S of the support 10 and to the width direction of the internal volume V of each structure. Each structure 1 (respectively 2) comprises a metal portion 12$_1$ (resp. 12$_2$), which is located on the layer of dielectric material 11, the latter possibly still being of silicon carbide and continuous over the entire face S of the support 10. However, this continuity of the layer 11 is not essential, and it may be advantageous, for alternative embodiments of the invention, to modify the composition of the layer 11 in certain areas of the face S, particularly in the internal volume V of at least one of the two structures 1 and 2, or in the intermediate space between these structures. As each of the Fabry-Perot structures 1 and 2 are in accordance with FIG. 1*b*, the references R1, R2, M1, M2, B1, and B2 of FIG. 1*b* identically apply for each structure 1 and 2 of FIG. 2*a*. The two metal portions 12$_1$ and 12$_2$ may each be of the same metal as the support 10. In addition, the following notations relate separately to one or the other of the two structures 1 and 2:

$\lambda_{r1}$: the individual resonance wavelength of Fabry-Perot structure 1, $Q_1$: the quality factor of the individual resonance of Fabry-Perot structure 1, $w_1$: the width of metal portion 12$_1$ along direction D, $n_{eff\_1}$: the effective refractive index for the dielectric medium in the internal volume V of Fabry-Perot structure 1, occupied by layer 11 in the example considered, $\lambda_{r2}$: the individual resonance wavelength of Fabry-Perot structure 2, $Q_2$: the quality factor of the individual resonance of Fabry-Perot structure 2, $w_2$: the width of metal portion 12$_2$ along direction D, $n_{eff\_2}$: the effective refractive index for the dielectric medium in the internal volume V of Fabry-Perot structure 2, occupied by layer 11 in the example considered, and $d_{1\text{-}2}$: the separation distance between the two Fabry-Perot structures 1 and 2, measured in direction D between the metal portions 12$_1$ and 12$_2$.

The definition of the effective refractive indices $n_{eff1}$ and $n_{eff2}$ is known from the prior art, as was restated at the beginning of this description. Under these conditions: $\lambda_{r1} \approx 2 \cdot n_{eff\_1} \cdot w_1$ and $\lambda_{r2} \approx 2 \cdot n_{eff\_2} \cdot w_2$. $Q_1$ and $Q_2$ are determined in particular by the thickness h of layer 11, and by its material near the reflecting surfaces R1 and R2 of each structure 1, 2. For the embodiment of the invention which is illustrated by FIG. 2*a*, h is the thickness of dielectric material which is common to the two Fabry-Perot structures 1 and 2, in other words $h_1 = h_2 = h$ where $h_1$ and $h_2$ respectively denote the thicknesses of dielectric material in the Fabry-Perot structures 1 and 2. However, in other embodiments of the invention, it is possible that the thicknesses of dielectric material $h_1$ and $h_2$ in the two Fabry-Perot structures 1 and 2 are different. The thickness of each metal portion 12$_1$, 12$_2$ may be 50 nm (nanometer) for example, and the thickness of the layer 11 of dielectric material may be 280 nm for example, these thicknesses being measured perpendicularly to the face S.

For embodiments of the invention with a one-dimensional pattern, the metal portions 12$_1$ and 12$_2$ may be strips which extend perpendicularly to the plane of FIG. 2*a*, and the group of the two Fabry-Perot structures 1 and 2, with the associated portions of the layer 11 or of the dielectric media used, can form a pattern which is periodically repeated in direction D. A coupling resonance produced by this pattern in isolation is described below, but those skilled in the art will understand that additional couplings may appear between two neighboring Fabry-Perot structures on the face S while belonging to different repeats of the pattern.

The following four conditions are necessary for the occurrence of coupling resonance:

$\lambda_{r1} \neq \lambda_{r2}$: a difference between the wavelengths of the individual resonances of the two Fabry-Perot structures 1 and 2 may result from two different values used for the strip widths $w_1$ and $w_2$. For example: $w_1 = 400$ nm and $w_2 = 495$ nm. Additionally or alternatively, two different values may be used for the effective refractive index of layer 11 in the respective internal volumes V of structures 1 and 2: $n_{eff\_1} \neq n_{eff\_2}$. Such a difference in refractive index may be obtained by compositions, dopings, or fill ratios of layer 11 which differ between the two structures 1 and 2. Alternatively or as a further addition, an absorption coefficient value specific to each Fabry-Perot structure may be used to vary its individual resonance wavelength;

the two wavelength ranges: $[\lambda_{r1} \cdot (1-3/Q_1); \lambda_{r1} \cdot (1+3/Q_1)]$ which comprises the individual resonance wavelength of structure 1, and $[\lambda_{r2} \cdot (1-3/Q_2); \lambda_{r2} \cdot (1+3/Q_2)]$ which comprises the individual resonance wavelength of structure 2, have an overlap. In other words, they are not disjoint. This condition can be satisfied by selecting the values of $\lambda_{r1}$ and $\lambda_{r2}$ so that they are sufficiently close, or by selecting the structural parameters of the pattern, in particular the thickness h of layer 11, so that the values of $Q_1$ and $Q_2$ are sufficiently low;

the thickness h of the layer 11 of dielectric material is greater than the two limit values $VL_1 = 0.125 \cdot \lambda_{r1}/n_{\mathit{eff}\_1}$ and $VL_2 = 0.125 \cdot \lambda_{r2}/n_{\mathit{eff}\_2}$, meaning that the two Fabry-Perot structures are under-coupled to the external propagation medium of the OI wave; and the separation distance $d_{1-2}$ between the two structures 1 and 2 is sufficiently small, in particular less than the coupling resonance wavelength as explained in detail below. $d_{1-2}$ corresponds to the width of the intermediate space $I_{1-2}$ which separates structures 1 and 2, as represented in FIG. 2a.

In FIG. 2a, $C_{1-2}$ denotes the coupling which is thus produced between the Fabry-Perot structures 1 and 2.

Under these conditions, two additional waves then result from the OI wave which is incident on the set of the two structures 1 and 2, in addition to the wave which results from the reflection of the OI wave on the face S of the support 10:

a first additional wave, denoted OR1, which emerges from Fabry-Perot structure 1 and which results from a superposition of several wave components of which at least one has completed a round trip inside Fabry-Perot structure 2. In other words, the amplitude of the additional wave OR1 depends on the coupling between the internal volume V of structure 1 and the free space from which the incident wave OI originates. In addition, at least one component of this additional wave OR1 has propagated within the internal volume V of structure 2, completing at least one round trip therein in parallel to direction D, then has crossed the intermediate space $I_{1-2}$ from structure 2 to structure 1, before being retransmitted into the free space by structure 1. Additional wave components, which may also contribute to forming additional wave OR1, may have completed any combinations of successive round trips within the internal volumes V of the two structures 1 and 2, with travelling across the intermediate space $I_{1-2}$ at each passage between a round trip within the internal volume V of one of the structures 1 or 2 and a round trip within the internal volume V of the other structure, before each one is retransmitted into the free space by structure 1; and a second additional wave, denoted OR2, which emerges from Fabry-Perot structure 2 and which results from a superposition of several other wave components of which at least one has completed a round trip inside Fabry-Perot structure 1. In other words, the amplitude of the additional wave OR2 depends on the coupling between the internal volume V of structure 2 and the free space from which the incident wave OI originates. In addition, at least one component of the additional wave OR2 has propagated within the internal volume V of structure 1, completing at least one round trip therein in parallel to direction D, then has crossed the intermediate space $I_{1-2}$ from structure 1 to structure 2, before being retransmitted into the free space by structure 2. As was the case for additional wave OR1, other additional wave components, which may also contribute to forming additional wave OR2, may have completed any combinations of round trips within the internal volumes V of the two structures 1 and 2, with travelling across the intermediate space $I_{1-2}$ at each passage between a round trip within the internal volume V of one of the structures 1 or 2 and a round trip within the internal volume V of the other structure, before each one is retransmitted in the free space by structure 2.

Figure 2B:
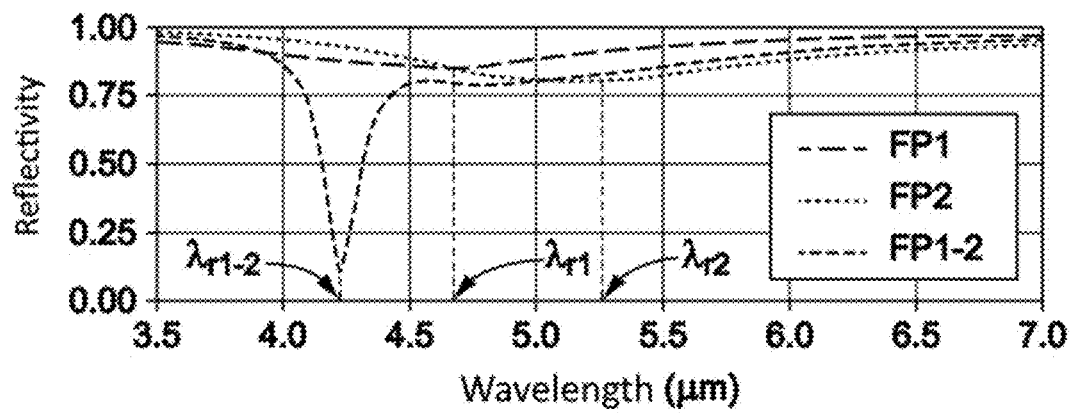

The two additional waves OR1 and OR2 are due to the coupling $C_{1-2}$ between the Fabry-Perot structures 1 and 2. Then, for a particular value of the wavelength of the OI wave, the wave which results from the reflection of the OI wave on the face S of the support 10, the first additional wave OR1, and the second additional wave OR2 form a constructive interference which contributes to forming the reflected wave OR. The diagram in FIG. 2b compares spectral reflectivity curves measured respectively for a first support 10 provided with Fabry-Perot structures 1 only (curve labeled FP1 and corresponding to $w_1 = 400$ nm), a second support 10 provided with Fabry-Perot structures 2 only (curve labeled FP2 and corresponding to $w_2 = 495$ nm), and a third support 10 provided with alternating Fabry-Perot structures 1 and 2 (curve labeled FP1-2 and corresponding to FIG. 2a). The value of the angle of incidence used in all three cases is 10° (degree), equal to the value of the angle of reflection of the OR wave, and the incident wave OI is rectilinearly polarized with its magnetic field parallel to the longitudinal direction of the strips which constitute the metal portions $12_1$ and $12_2$. In all three cases, the support 10 is of gold with a thickness of 200 nm, the metal portions are also of gold with thicknesses of 50 nm, and layer 11 is continuous and uniform of silicon carbide with a thickness of 280 nm. The values of $w_1$ and $w_2$ are those given above, and the separation distances between strips are equal to 437 nm in all three cases. Under these conditions, the individual resonance of Fabry-Perot structures 1 has the following characteristics: $\lambda_{r1} \approx 4.65$ μm and a minimum spectral reflectivity value greater than 0.80 (see curve FP1), and the individual resonance of Fabry-Perot structures 2 has the other characteristics: $\lambda_{r2} \approx 5.25$ μm and a minimum spectral reflectivity value which is also greater than or equal to 0.80 (see curve FP2). The value of 280 nm for the thickness h of layer 11 is greater than the two limit values $VL_1 = 0.125 \cdot \lambda_{r1}/n_{\mathit{eff}\_1}$ and $VL_2 = 0.125 \cdot \lambda_{r2}/n_{\mathit{eff}\_2}$ ($n_{\mathit{eff}\_1} = n_{\mathit{eff}\_2}$ in the embodiment described), respectively equal to 184 nm and 208 nm, ensuring that the two Fabry-Perot structures 1 and 2 are each used under conditions of under-coupling with the external propagation medium. The additional resonance, which is provided by the coupling between structures 1 and 2, appears when the wavelength of the incident wave OI has the value of 4.23 μm (see curve FP1-2). This is the coupling resonance wavelength, which is denoted $\lambda_{r1-2}$. The associated minimum for spectral reflectivity is approximately 0.13, corresponding to a value of 22 for the quality factor $Q_{1-2}$ which is associated with the coupling resonance. The support 10 of FIG. 2a, with structures 1 and 2, then forms a spectral filter which is effective in reflection. For this first example, the value of the spatial repeat period of the pattern formed by the two Fabry-Perot structures 1 and 2 is 1770 nm.

In general, for the coupling between the two Fabry-Perot structures 1 and 2 to be sufficient to produce the coupling resonance, the separation distance $d_{1-2}$ must be less than the value of the coupling resonance wavelength $\lambda_{r1-2}$. In the present case, $d_{1-2}$ is approximately equal to 437 nm.

At all identical values and compositions apart from the widths $w_1$, $w_2$ and the separation distance $d_{1-2}$, the coupling resonance wavelength $\lambda_{r1-2}$ becomes equal to 4.61 μm when $w_1$=495 nm, $w_2$=600 nm, and $d_{1-2}$=337 nm. The minimum reflectivity value is then approximately 0.21, obtained when the wavelength of the incident wave OI is equal to $\lambda_{r1-2}$. Thus, appropriately selecting the width values of the metal strips allows adjusting the coupling resonance wavelength to a desired value.

Figure 3:
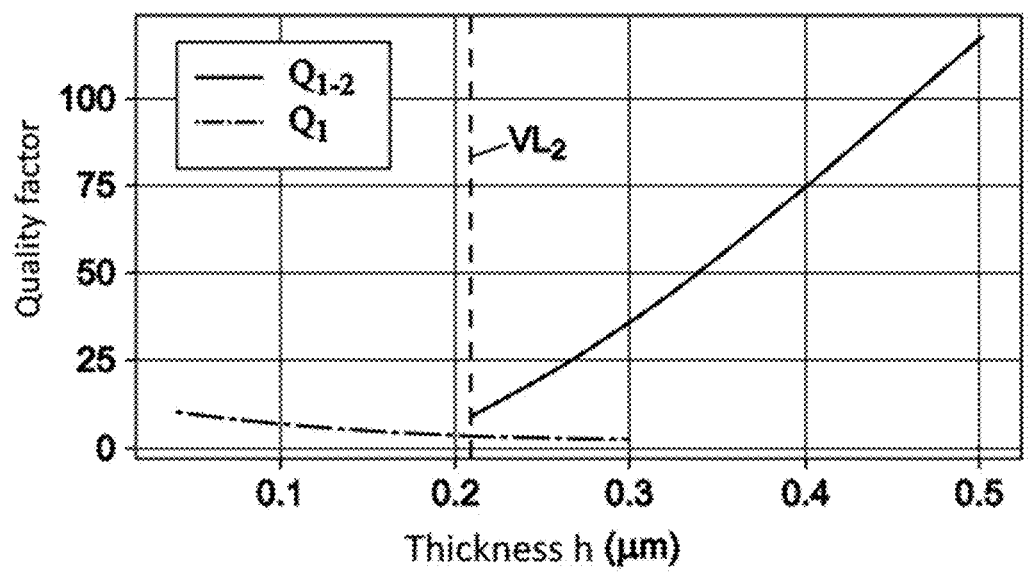
FIG. 3 is a diagram showing variations in the quality factors for an individual resonance and a coupling resonance of Fabry-Perot structures.

The diagram of FIG. 3 shows the variations of the quality factor $Q_{1-2}$ of the coupling resonance (continuous curve) which result from modifying the thickness h of layer 11, compared to the embodiment of FIGS. 2a and 2b. Beyond the thickness limit value $VL_2$=max($VL_1$; $VL_2$)=approximately 0.208 μm for layer 11, the value of the quality factor $Q_{1-2}$ of the coupling resonance increases continuously, reaching approximately 250 for the value of 800 nm for the thickness h of layer 11. Thus, appropriately selecting the thickness h of layer 11 allows adjusting the width and depth of the spectral reflectivity minimum which is associated with the coupling resonance. For comparison, the diagram in FIG. 3 also shows the variation of the quality factor $Q_1$ of the individual resonance of a single Fabry-Perot structure, when the thickness h of layer 11 varies and when the width w of the strip which forms the metal portion 12 is constant and equal to 495 nm (dotted curve). The quality factor $Q_1$ of the individual resonance is a decreasing function of the thickness h of layer 11, while the quality factor $Q_{1-2}$ of the coupling resonance is an increasing function of this thickness h.

Figure 4:
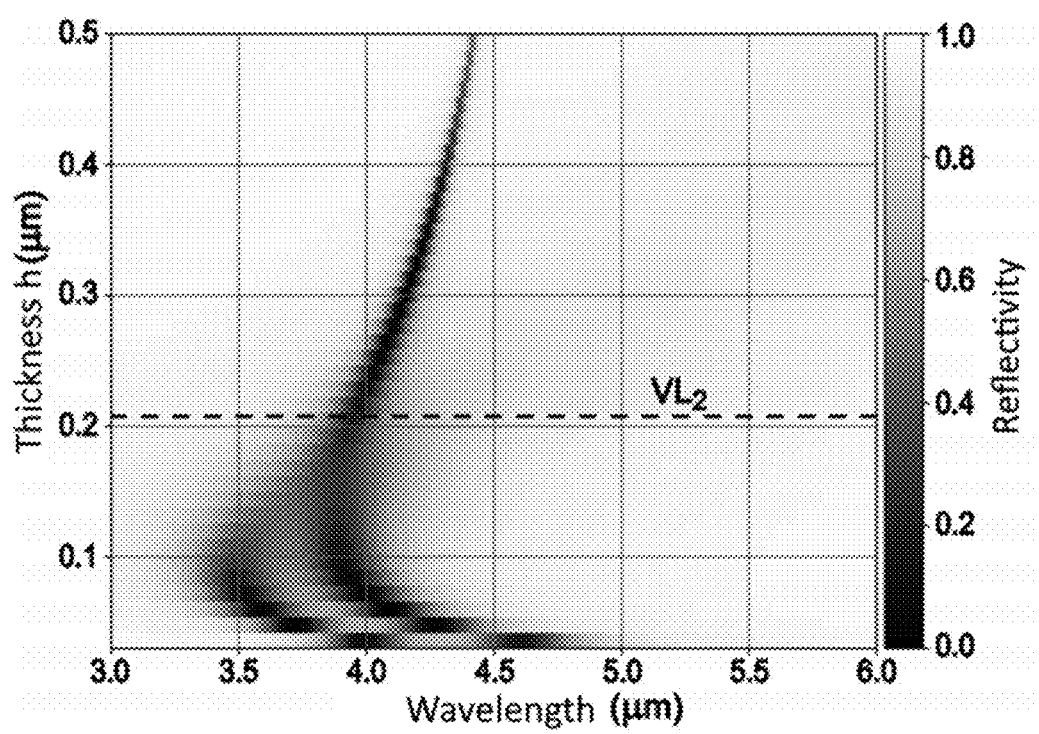

The horizontal axis of the diagram in FIG. 4 identifies the wavelength values of the incident wave OI, the vertical axis identifies the values of the thickness h of the layer 11 of dielectric material, and the third dimension, indicated by the scale of gray shades arranged to the right of the diagram, identifies the energy reflectivity values of the spatial filter of FIGS. 2a and 2b, when only the thickness h varies. The coupling resonance, which is produced by three-wave interference, exists when the thickness h is greater than $VL_2$=max($VL_1$; $VL_2$)=approximately 0.208 μm, and is associated with an energy reflectivity minimum which is narrow, corresponding to high values of quality factor $Q_{1-2}$. When the thickness h is less than this limit value, two separate resonances are visible, which correspond to the respective individual resonances of the Fabry-Perot structures 1 and 2. The variations of the resonance wavelength values $\lambda_{r1}$ and $\lambda_{r2}$ which are visible in this part of the diagram are due to the spectral variations of the effective refractive index of the dielectric material of layer 11. The spectral filters described in the article entitled "Plasmonic nano-antennas for spectral emissivity engineering" cited above, by M. Makhsiyan et al., Proc of SPIE, Vol. 9502, 2015, all correspond to the situation where the thickness h of the dielectric layer is less than max($VL_1$; $VL_2$), where no coupling resonance due to three-wave interference exists. The energy reflectivity spectrum which is then obtained is substantially equal to the product of the respective individual resonance spectra of the two Fabry-Perot structures.

Figure 5A:
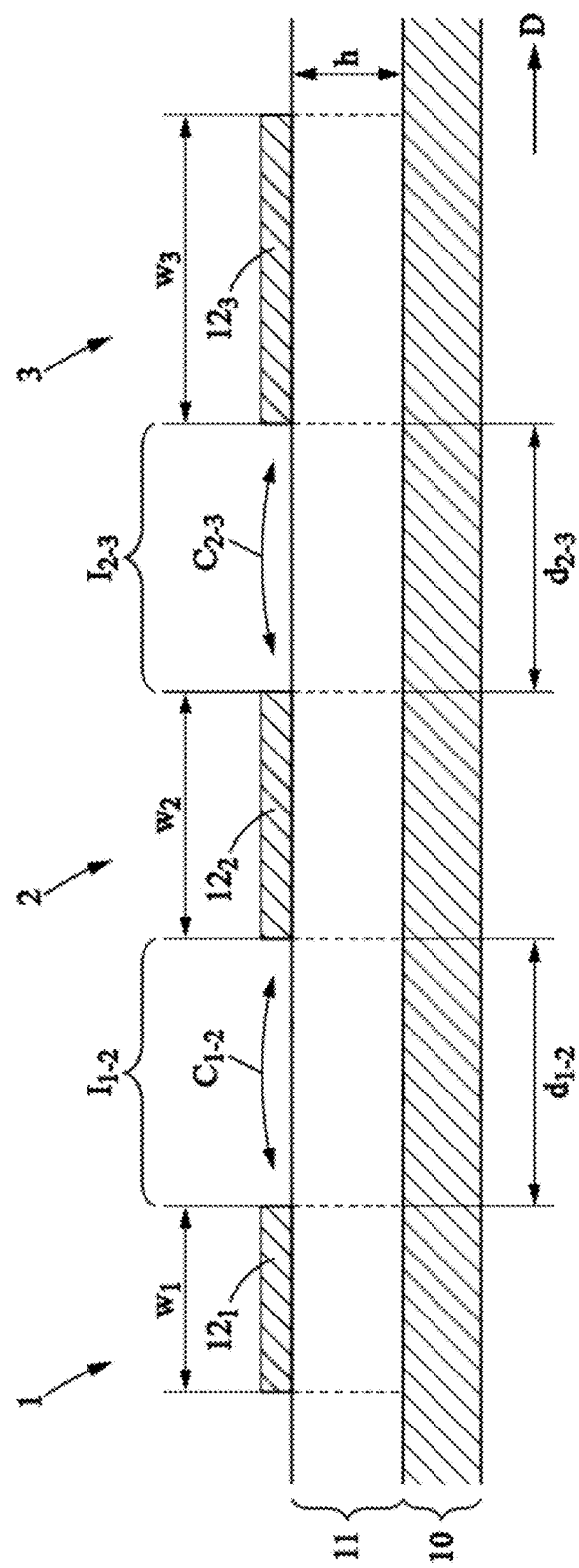
FIGS. 5a and 5b respectively correspond to FIGS. 2a and 2b, for a second embodiment of the invention with three Fabry-Perot structures per group.

In the embodiment of FIG. 5a, each group of Fabry-Perot structures comprises three structures, denoted 1, 2, and 3. The respective metal portions of these three Fabry-Perot structures, in the form of parallel strips whose common longitudinal direction is again perpendicular to the plane of the figure, are referenced $12_1$, $12_2$, and $12_3$. Their respective width values are $w_1$=405 nm, $w_2$=500 nm, and $w_3$=600 nm, with the spatial repeat period of the pattern formed by the three Fabry-Perot structures 1, 2 and 3 being equal to 2540 nm. $d_{1-2}$ is the separation distance between structures 1 and 2 across intermediate space $I_{1-2}$, for example equal to about 300 nm, and $d_{2-3}$ is the separation distance between structures 2 and 3 across intermediate space $I_{2-3}$, for example also equal to 300 nm. $C_{1-2}$ designates the resulting coupling between Fabry-Perot structures 1 and 2, and $C_{2-3}$ the coupling between Fabry-Perot structures 2 and 3. The three metal portions $12_1$, $12_2$, and $12_3$ may again be of the same metal as the support 10, so that the value of the effective refractive index of the dielectric material is the same for the three Fabry-Perot structures 1, 2, and 3.

Figure 5B:
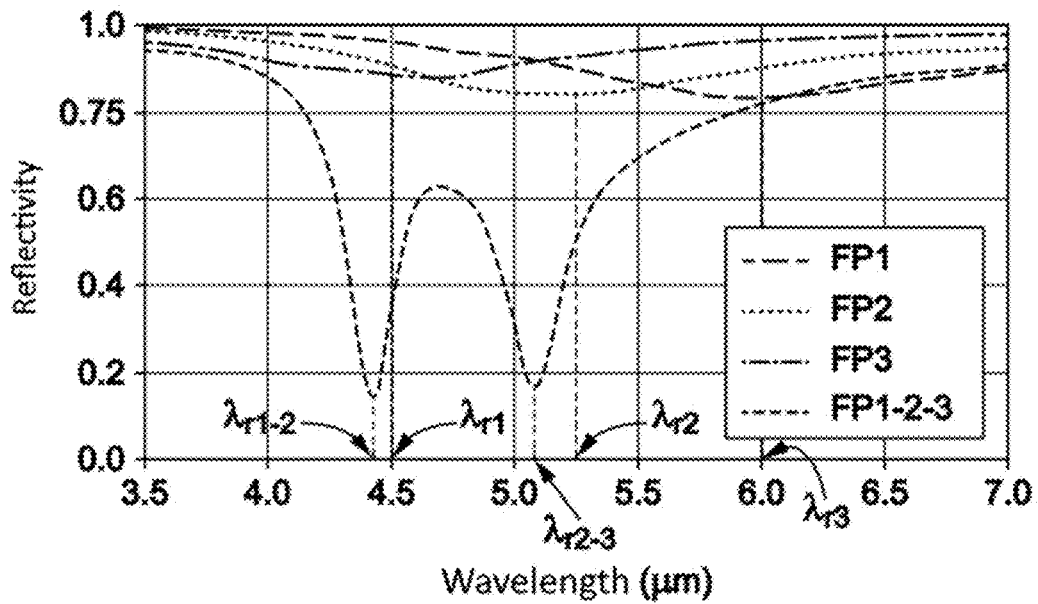

The diagram of FIG. 5b shows the spectral reflectivity curves which were measured respectively for a first support 10 provided with Fabry-Perot structures 1 only (curve labeled FP1 and corresponding to $w_1$=405 nm), a second support 10 provided with Fabry-Perot structures 2 only (curve labeled FP2 and corresponding to $w_2$=500 nm), a third support 10 provided with Fabry-Perot structures 3 only (curve labeled FP3 and corresponding to $w_3$=600 nm), and the support 10 provided with alternating Fabry-Perot structures 1, 2, and 3 (curve labeled FP1-2-3 corresponding to FIG. 5a). The polarization and incidence conditions of the incident wave OI are the same as for the diagram of FIG. 2b. The individual resonance wavelength values are $\lambda_{r1}$≈4.5 μm for structure 1 (see curve FP1), $\lambda_{r2}$≈5.2 μm for structure 2 (see curve FP2), and $\lambda_{r3}$≈6.0 μm for structure 3 (see curve FP3), with minimum reflectivity values which are all greater than 0.80 for these three individual resonances. In other words, the condition where the thickness h of layer 11 must be greater than the three limit values $0.125\lambda_{r1}/n_{eff}$, $0.125·\lambda_{r2}/n_{eff}$, and $0.125·\lambda_{r3}/n_{eff}$ is satisfied. The filter of FIG. 5a, in which the pattern is formed by the group of three Fabry-Perot structures 1, 2, and 3, then has two coupling resonances (see curve FP1-2-3): a first coupling resonance for wavelength value $\lambda_{r1-2}$≈4.43 μm, associated with a first quality factor value $Q_{1-2}$ equal to 15, and a second coupling resonance for wavelength value $\lambda_{r2-3}$≈5.12 μm, associated with a second quality factor value $Q_{2-3}$ equal to 11. The first coupling resonance, corresponding to $\lambda_{r1-2}$ and $Q_{1-2}$, comes from the coupling $C_{1-2}$ between strips 1 and 2 through intermediate space $I_{1-2}$, and the second coupling resonance, corresponding to $\lambda_{r2-3}$ and $Q_{2-3}$, comes from the coupling $C_{2-3}$ between strips 2 and 3 through intermediate space $I_{2-3}$. The structures 1 and 3, even when they are close by being part of successive patterns, are not coupled to each other because of their individual resonance wavelength values which are too far apart.

Figure 6:
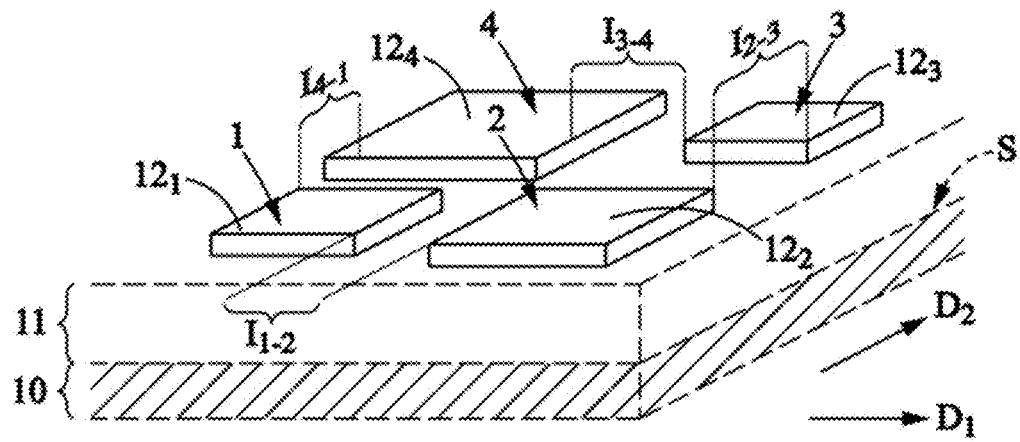
FIG. 6 is a perspective view of a third embodiment of the invention, with four Fabry-Perot structures per group.

FIG. 6 shows another embodiment of the invention, with two directions of variation of the pattern which are denoted $D_1$ and $D_2$. For example, a group of four Fabry-Perot structures 1-4, which are arranged in a 2×2 matrix parallel to directions $D_1$ and $D_2$, can be used as a pattern which is reproduced periodically in these two directions. Each Fabry-Perot structure 1-4 can be identified by a respective portion of metal layer $12_1$-$12_4$ which is arranged on the layer of dielectric material 11, the latter being on the face S of the metal support 10. At least two of the Fabry-Perot structures 1-4 are different, for example in the dimensions of the portions of metal layer $12_1$-$12_4$. As an example but in a non-limiting manner, each portion of metal layer $12_1$-$12_4$ may be a square for which the side length is selected from the values 640 nm, 680 nm, 780 nm, and 840 nm, for a repeat period of the pattern in directions $D_1$ and $D_2$ which may be equal to 2200 nm. The intermediate spaces between neighboring Fabry-Perot structures are $I_{1-2}$ between structures 1 and 2, $I_{2-3}$ between structures 2 and 3, $I_{3-4}$ between structures 3 and 4, and $I_{4-1}$ between structures 4 and 1. Then, by modifying the lengths of the sides of the portions $12_1$-$12_4$ and the widths of the intermediate spaces between them, the values of the coupling resonance wavelengths can be adjusted as well as the values of the quality factors and the spectral reflectivity minima associated with them. Generally, a coupling resonance is separately associated with each pair of Fabry-Perot structures in the pattern. However, when two of these Fabry-Perot structures have individual resonance wavelength values that are too far apart from each other, these two structures are not coupled together. It is possible in particular to distribute the four Fabry-Perot structures in the 2×2 matrix of the pattern so that two structures which are on the same diagonal in the 2×2 matrix are not coupled together for this reason.

In yet other embodiments of the invention, which may also have a distribution of the Fabry-Perot structures in a 2×2 matrix within a two-dimensional pattern, the portions of metal layer $12_1$-$12_4$ may have shapes that are rectangular, circular, elliptical, cross-shaped, L-shaped, etc., parallel to the face S, depending on the difference in response that is desired for the filter between two effective orthogonal polarizations for the incident wave OI. Those skilled in the art know how to select these shapes according to the desired selectivity for the filter relative to the polarization of the incident wave OI. Similarly, from the present description, the skilled person will be able to take into account the effect of the separation distances between Fabry-Perot structures, on the selectivity of the filter relative to the polarization of the OI wave. In addition, the composition and material of layer 11 in the intermediate spaces $I_{1-2}$, $I_{2-3}$, $I_{3-4}$, and $I_{4-1}$ can be varied to adjust the coupling between two neighboring Fabry-Perot structures.

In general, given the embodiments of the invention just described, a person skilled in the art will understand that a filter according to the invention can be formed by repeating any pattern of several Fabry-Perot structures, without limitation as to the number of structures that form the pattern nor to their arrangement in this pattern. The condition is that at least two of these Fabry-Perot structures are coupled while having compositions that are in accordance with FIG. 1b. The large number of degrees of freedom which results from this makes it possible to design on demand a filter whose spectral response profile corresponds to any specifications.

Figure 7A:
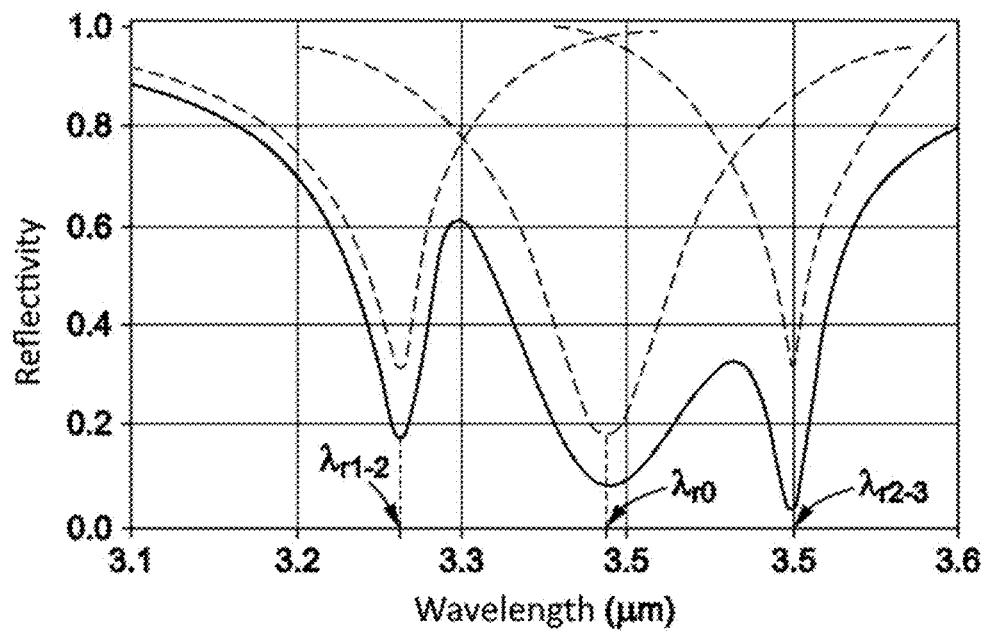
FIG. 7a is a spectral selectivity diagram for a filter in accordance with an improvement of the invention.

We will now describe an empirical way of designing a filter in accordance with the invention, for which the spectral response profile comprises a controlled transition between a cutoff spectral domain and a windowed spectral domain. To do so, the filter may be an association between at least one Fabry-Perot resonator and at least one group of several Fabry-Perot structures coupled as described above. Fabry-Perot resonator is then understood to mean an additional Fabry-Perot structure which is used within the filter for its individual resonance, as opposed to the coupled Fabry-Perot structures which are used for their coupling resonance(s). In general, the spectral profile of the individual resonance of the Fabry-Perot resonator is wider, on a wavelength axis, than the spectral profile of the coupling resonance of two Fabry-Perot structures coupled according to the invention. However, the spectral profile of the filter results from an additive combination of the energy absorptions caused by all the resonances—individual or coupling. Then, by adjusting the respective parameters of the coupled Fabry-Perot structures and of the Fabry-Perot resonator, it is possible to superimpose, on the wavelength axis of the incident wave OI, at least one coupling resonance with one side of the individual resonance of the Fabry-Perot resonator. In other words, the value of the wavelength of the coupling resonance, denoted $\lambda_{r1-2}$, can be different from $\lambda_{r0}$ but within the range $[\lambda_{r0} \cdot (1-10/Q_0); \lambda_{r0} \cdot (1+10/Q_0)]$, where $\lambda_{r0}$ and $Q_0$ are respectively the values of the resonance wavelength and of the quality factor for the individual resonance of the Fabry-Perot resonator. The coupled structures thus make it possible to locally modify the spectral profile of the Fabry-Perot resonator, when the quality factor of the coupling resonance is greater, or even much greater, than the quality factor of the Fabry-Perot resonator. As an illustration, the diagram of FIG. 7a shows the spectral response in reflection of such a filter which combines a Fabry-Perot resonator and three Fabry-Perot structures coupled in accordance with FIG. 5a. In this example, the individual resonance wavelength $\lambda_{r0}$ of the Fabry-Perot resonator is equal to approximately 3.39 µm, with a value of 20 for the corresponding quality factor $Q_0$, the first coupling resonance wavelength $\lambda_{r1-2}$ is equal to about 3.26 µm, with a value of 60 for the corresponding quality factor $Q_{1-2}$, and the second coupling resonance wavelength $\lambda_{r2-3}$ is equal to about 3.50 µm, also with a value of 60 for the corresponding quality factor $Q_{2-3}$.

Figure 7B:
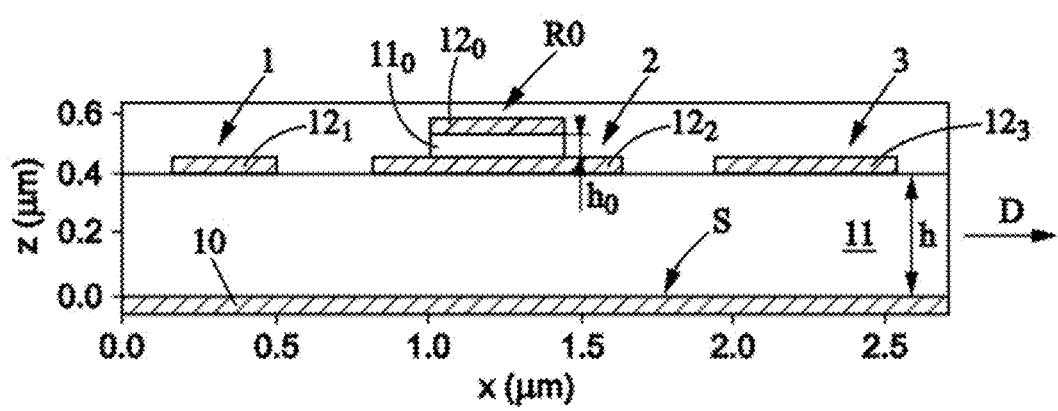

FIG. 7b shows the pattern of such a filter. This pattern comprises a portion of the support 10, a portion of layer 11, and the Fabry-Perot structures 1-3 of FIG. 5a, with their respective metal portions $12_1$, $12_2$, and $12_3$. It further comprises at least one additional Fabry-Perot resonator, which can be stacked on one of structures 1-3, for example on structure 2. This additional resonator is designated by the reference R0, and may advantageously also be of the type described with reference to FIG. 1b. In this case, it may be formed by a strip of additional dielectric material 11₃ which is arranged on the portion of metal layer $12_2$, and by an additional portion of metal layer $12_0$ which is arranged on this dielectric material strip $11_0$. The metal portion $12_2$ is thus shared between this Fabry-Perot resonator R0 and Fabry-Perot structure 2. The strip $11_0$ may again be made of silicon carbide, and portion $12_0$ may again be made of gold. The horizontal direction of FIG. 7b has a spatial dimension axis, labeled x, for identifying the widths of the strips which form portions $12_1$, $12_2$, $12_3$, and $12_0$, as well as the separation distances between them. The vertical direction of FIG. 7b has another spatial dimension axis, labeled z, for identifying the thicknesses of layer 11, of portions $12_1$, $12_2$, $12_3$, and $12_0$, as well as of the strip of additional dielectric material $11_0$. This pattern is repeated periodically along direction D on the face S of the support 10, covered by layer 11, to form the filter. For the embodiment of FIG. 7a, the thickness $h_0$ of the strip of additional dielectric material $11_0$ is about 80 nm, and the width of the portion of metal layer $12_0$ along direction D is approximately 450 nm.

Those skilled in the art will then understand that a spectral filtering profile which is more elaborate than that of FIG. 7a, in particular a spectral filtering profile which has a more or less rectangular shape, can be obtained according to the invention by using a pattern of Fabry-Perot structures having more than three structures.

Such a filter can have many applications, particularly in imaging and spectroscopy, according to modes of implementation which are well known to those skilled in the art.

A further application can be a selective thermal emission of electromagnetic radiation. To achieve this, the filter may be heated or applied to a block of material which is heated. Emission of electromagnetic radiation then occurs, its spectrum restricted to within the spectral selection window(s) of the filter, and the emission intensity dependent on the temperature of the filter.

Finally, it is understood that the invention may be implemented by modifying numerous secondary aspects of the embodiments described in detail above. In particular, these described embodiments have been designed for filtering functions which are efficient in reflection. It is possible to apply the invention to embodiments adapted for producing filtering functions which are efficient in transmission. Finally, all the numerical values described were provided for illustrative purposes only, and can be modified to the application intended for each filter.

The invention claimed is:

1. A spectral filter comprising at least one group of a plurality of Fabry-Perot structures which are collectively carried by a face of a support of the filter, each Fabry-Perot structure comprising two portions of reflecting surfaces which are arranged facing one another, parallel to one another, and separated from one another inside the structure by a dielectric medium, each of the Fabry-Perot structures of the group being sized so that a wave component of electromagnetic radiation can propagate between the two portions of reflecting surfaces of said structure, from one to the other, and so that a standing wave results from multiple reflections of the wave component which occur in alternation at the two portions of reflecting surfaces, and an individual resonance of said Fabry-Perot structure corresponding to a maximum of amplitude of said standing wave inside said structure when a wavelength of an electromagnetic radiation incident on the filter varies, at least one of the portions of reflecting surfaces of each Fabry-Perot structure of the group being separated from at least one of the portions of reflecting surfaces of each other structure by an intermediate space parallel to the face of the support, wherein at least one parameter which determines the individual resonance of each Fabry-Perot structure, separately from each other Fabry-Perot structure, has values which differ between at least two of the structures of the same group, so that said at least two structures of the group have respective values of individual resonance wavelength, effective for the electromagnetic radiation incident on the filter, which are different, and said at least two structures with different values of individual resonance wavelength having respective values of an individual resonance quality factor such that, on a wavelength axis of the incident radiation, the following ranges of individual resonances: $[\lambda_{ri}\cdot(1-3/Q_i); \lambda_{ri}\cdot(1+3/Q_i)]$, have pairwise overlaps, where i is an integer that identifies each Fabry-Perot structure within the group, and $\lambda_{ri}$ and $Q_i$ are respectively the values of the resonance wavelength and of the quality factor of the individual resonance of Fabry-Perot structure i, and wherein a thickness $h_i$ of the dielectric medium, relative to Fabry-Perot structure i and measured perpendicularly to a direction of propagation of the wave components forming the standing wave inside said Fabry-Perot structure i, is greater than or equal to $0.125\cdot\lambda_{ri}/n_{eff\_i}$, $n_{eff\_i}$ being an effective refractive index for the dielectric medium of Fabry-Perot structure i, and wherein a coupling between two of the Fabry-Perot structures of the same group, whose individual resonance wavelength values are different, is produced by the intermediate space existing between said two structures, possibly also by a material present in said intermediate space, a separation distance between the two Fabry-Perot structures thus coupled, determined by said intermediate space and measured parallel to the face of the support, being less than a resonance wavelength value relating to the coupling, called coupling resonance wavelength, which is effective for the electromagnetic radiation incident on the filter, and which results from an interference between at least three waves which include:

a first wave which originates from a reflection of the incident radiation on the face of the support, or from a transmission of the incident radiation through the support;

a second wave which comes out from a first of the Fabry-Perot structures of the group, and which results from a superposition of several wave components among which at least one of said wave components has completed at least one round trip inside a second of the Fabry-Perot structures of said group, coupled with said first structure; and a third wave which comes out from said second of the structures of Fabry-Perot of the group, and which results from another superposition of several other wave components among which at least one of said other wave components has completed at least one round trip inside said first of the Fabry-Perot structures of said group, and wherein each Fabry-Perot structure of the group comprises two portions of metal surfaces which are parallel to the face of the support, and an internal volume which is limited between said two portions of metal surfaces perpendicularly to the face of the support, and limited parallel to the face of the support between opposite edges of at least one of said two portions of metal surfaces of the structure, said two opposite edges determining positions of the portions of reflecting surfaces of the Fabry-Perot structure, so that the wave components which contribute to the coupling resonance propagate parallel to the face of the support inside each of the coupled Fabry-Perot structures of the group.

2. The spectral filter of claim 1, wherein the parameter which determines the individual resonance of each Fabry-Perot structure of the group, separately from each other Fabry-Perot structure of said group, and which has values which differ between two structures which are coupled with each other, is one of the following parameters or a combination thereof:

a width of the internal volume of each structure, measured parallel to the face of the support between the portions of reflecting surfaces of said structure, a refractive index of the dielectric medium in the internal volume of each structure, a fill ratio and/or a composition of the dielectric medium in the internal volume of each structure, and a coefficient of electromagnetic radiation absorption by each structure.

3. The spectral filter of claim 2, wherein each Fabry-Perot structure of the group is designed so that the value of the individual resonance quality factor of said structure is less than 20, and wherein the group of Fabry-Perot structures is designed so that a quality factor associated with the coupling resonance is greater than 20.

4. The spectral filter of claim 2, wherein, for each Fabry-Perot structure of the group, the dielectric medium in the internal volume of said structure consists of a respective portion of a layer having parallel faces and uniform thickness, of a solid dielectric material, said layer being identical for all structures of the group.

5. The spectral filter of claim 1, wherein each Fabry-Perot structure of the group is designed so that the value of the individual resonance quality factor of said structure is less than 20,
and wherein the group of Fabry-Perot structures is designed so that a quality factor associated with the coupling resonance is greater than 20.

6. The spectral filter of claim 5, wherein each Fabry-Perot structure of the group that is designed so that the value of the individual resonance quality factor of said structure is less than 20, comprises a thickness of the internal volume between the two portions of metal surfaces of said structure, measured perpendicularly to the face of the support, and
wherein the group of Fabry-Perot structures that is designed so that a quality factor associated with the coupling resonance is greater than 20 comprises the intermediate space between two of the structures of said group which are coupled.

7. The spectral filter of claim 1, wherein, for each Fabry-Perot structure of the group, the dielectric medium in the internal volume of said structure consists of a respective portion of a layer having parallel faces and uniform thickness, of a solid dielectric material, said layer being identical for all structures of the group.

8. The spectral filter of claim 1, wherein a pattern which comprises the Fabry-Perot structures of the group, as separated by each intermediate space between two of said structures within the group, is repeated multiple times on the face of the support.

9. The spectral filter of claim 8, wherein at least one of the portions of metal surfaces of each of the Fabry-Perot structures is one face of a respective metal strip, and wherein the pattern which comprises the group of Fabry-Perot structures is repeated multiple times in a repeat direction which is parallel to the face of the support, in the form of separate and parallel metal strips.

10. The spectral filter of claim 8, wherein at least one of the portions of metal surfaces of each Fabry-Perot structure has a square, rectangular, circular, elliptical, cross, or L shape, parallel to the face of the support, and the pattern comprising the Fabry-Perot structures of the group is repeated multiple times in two repeat directions which are distinct and parallel to the face of the support.

11. The spectral filter of claim 10, wherein the pattern comprises four Fabry-Perot structures which are arranged in a 2×2 matrix along the two repeat directions, thus forming six pairs of Fabry-Perot structures, each pair being associated with an intermediate space between the two structures of said pair other than the intermediate space of every other pair of structures in the pattern, and at least some of the intermediate spaces producing a coupling between the structures of the corresponding pair.

12. The spectral filter of claim 8, wherein at least one of the portions of metal surfaces of each of the Fabry-Perot structures is one face of a respective metal strip, and wherein the pattern which comprises the group of Fabry-Perot structures is repeated periodically in a repeat direction which is parallel to the face of the support, in the form of separate and parallel metal strips.

13. The spectral filter of claim 8, wherein at least one of the portions of metal surfaces of each Fabry-Perot structure has a square, rectangular, circular, elliptical, cross, or L shape, parallel to the face of the support, and the pattern comprising the Fabry-Perot structures of the group is repeated periodically in two repeat directions perpendicular to each other which are distinct and parallel to the face of the support.

14. The spectral filter of claim 1, suitable for reflection, wherein the first, second, and third waves are produced by the filter on one side of the support where the incident radiation reaches said filter.

15. The spectral filter of claim 1, further comprising at least one Fabry-Perot resonator which has an additional individual resonance, effective for the incident radiation, in addition to each coupling resonance, the Fabry-Perot resonator being designed so that the individual resonance wavelength value of said resonator is shifted relative to at least one coupling resonance wavelength value of the group of Fabry-Perot structures, and so that said coupling resonance wavelength value is within the following range for the individual resonance of the Fabry-Perot resonator: $[\lambda_{r0}\cdot(1-10/Q_0); \lambda_{r0}\cdot(1+10/Q_0)]$, where $\lambda_{r0}$ and $Q_0$ are respectively the values of the resonance wavelength and of the quality factor for the individual resonance of the Fabry-Perot resonator, so that a spectral response profile of the filter, as a function of the wavelength of the incident radiation, results from a superposition of at least the individual resonance of each Fabry-Perot resonator with each coupling resonance of each group of Fabry-Perot structures, and has a steeper transition between a cutoff spectral domain and a windowed spectral domain, compared to a reference filter which includes said at least one Fabry-Perot resonator but which is devoid of the coupled Fabry-Perot structures.

16. The spectral filter of claim 15, wherein each Fabry-Perot resonator (R0) is designed so that the value of the quality factor of the individual resonance of said resonator is less than 30,
and wherein the quality factor associated with the coupling resonance wavelength located within the range $[\lambda_{r0}\cdot(1-10/Q_0); \lambda_{r0}\cdot(1+10/Q_0)]$ is greater than 30.

17. The spectral filter of claim 15, wherein a thickness of an internal volume of said resonator, measured perpendicularly to a direction of a standing wave occurring in said internal volume of the resonator, is designed so that the value of the quality factor of the individual resonance of said resonator is less than 30,
and wherein the quality factor associated with the coupling resonance wavelength located within the range $[\lambda_{r0}\cdot(1-10/Q_0); \lambda_{r0}\cdot(1+10/Q_0)]$ is greater than 30.

18. The spectral filter of claim 15, wherein the Fabry-Perot resonator (R0) is stacked on one of the Fabry-Perot structures of the group, in a stacking direction which is perpendicular to the face of the support.

19. The spectral filter of claim 18, wherein a portion of metal layer is common to the Fabry-Perot resonator and to the Fabry-Perot structure of the group on which said Fabry-Perot resonator is stacked, said portion of metal layer constituting one of the portions of metal surfaces of said Fabry-Perot structure.

20. A method for the spectral filtering of an electromagnetic radiation, implemented using at least one spectral filter that is in accordance with claim 1, the radiation to be filtered having wavelength values which are larger than the intermediate space, measured parallel to the face of the support, which exists between two Fabry-Perot structures of the filter which are coupled with each other,
the method being implemented for an application selected from: monochromatic or multispectral image capture, spectroscopic analysis, and selective emission of radiation produced by heating of the filter.

* * * * *